UNITED STATES PATENT OFFICE.

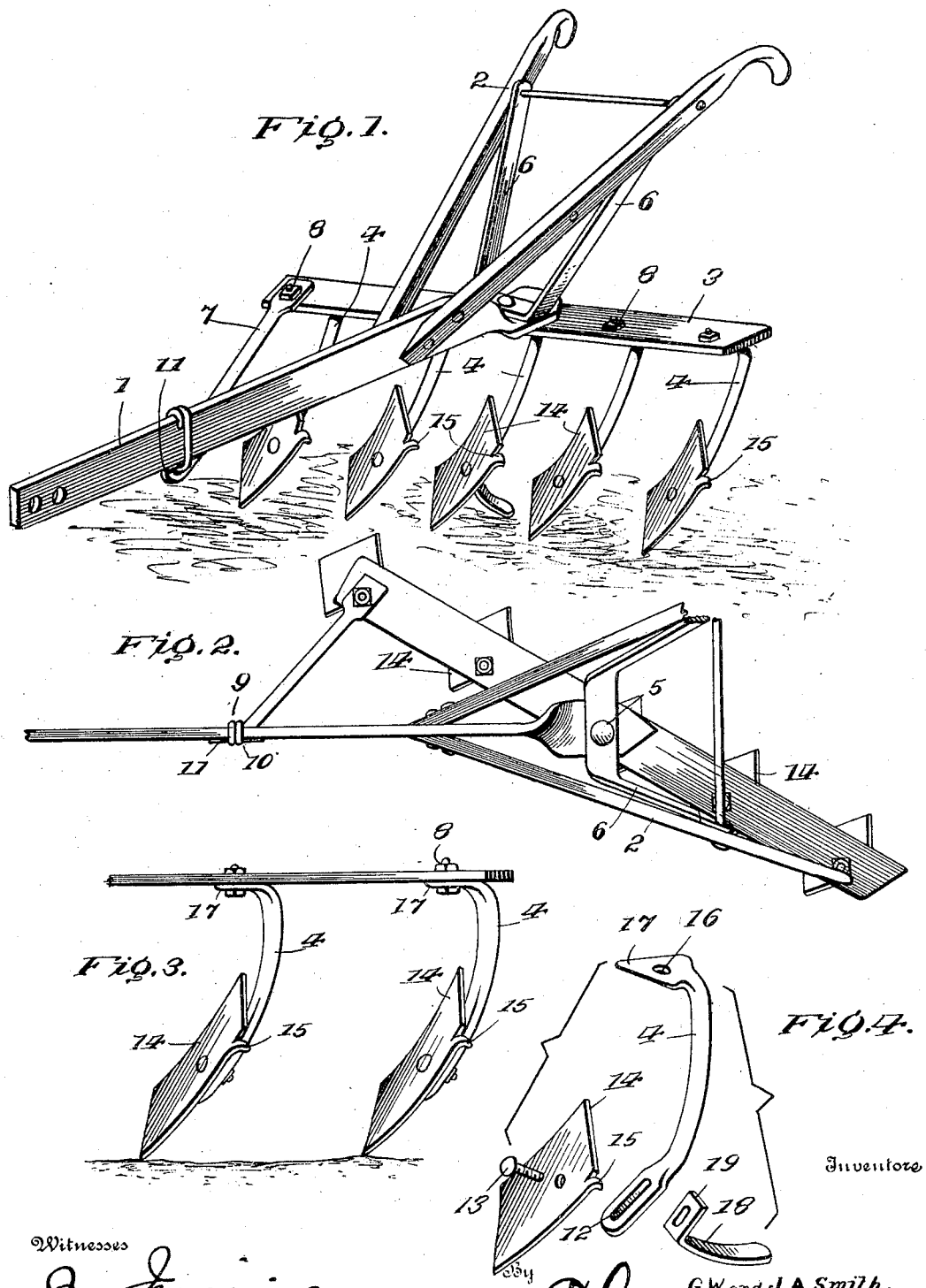

GEORGE W. SMITH AND JAMES A. SMITH, OF POPLARVILLE, MISSISSIPPI.

CULTIVATOR.

No. 798,537. Specification of Letters Patent. Patented Aug. 29, 1905.

Application filed December 13, 1904. Serial No. 236,722.

*To all whom it may concern:*

Be it known that we, GEORGE W. SMITH and JAMES A. SMITH, citizens of the United States, residing at Poplarville, in the county of Pearl River and State of Mississippi, have invented certain new and useful Improvements in Cultivators, of which the following is a specification.

This invention relates to improvements in agricultural implements, embodying a novel form of cultivator designed for use in tilling the soil, and aims to provide means of this type susceptible of a broad application in operating upon the soil at different periods in the production of crops, thereby obviating the necessity for use of special implements for a certain class of work and giving rise to other resultant advantages which will be apparent to those versed in agriculture.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment of the invention is shown in the accompanying drawings, in which—

Figure 1 is a perspective view of an agricultural implement embodying the essential features of the invention. Fig. 2 is a top plan view of the invention. Fig. 3 is a view in elevation, showing a portion of the horizontal supporting-bar, a couple of the standards being shown in position. Fig. 4 is a perspective view of one of the standards of the cultivator, bringing out more clearly the means for attaching the shovel thereto and the landside secured to the lower extension of the standard.

Corresponding and like parts are referred to in the following description and indicated in all the views of the drawings by the same reference characters.

Describing specifically the details of construction of the invention, the cultivator comprises the usual members ordinarily employed in devices of this class—namely, the beam 1, the handles 2, extending up from said beam, the transverse supporting-bar 3, and a plurality of standards 4, carried by said bar 3. The beam 1 is provided at its front extremity with suitable draft means. (Not shown.) The implement is designed as a walking-cultivator and may be readily drawn by means of a single animal, the construction of the cultivator being such as to decrease the draft to a minimum, which is advantageous. The transverse bar 3 is pivotally secured to the rear portion of the beam 1 by means of a suitable pin or bolt 5, and this member 5 attaches a U-shaped brace 6 to the beam 1, said brace 6 being connected at its upper ends with the handles 2, as shown most clearly in Fig. 1 of the drawings. It will thus be noted that the bar 3 is adapted for a pivotal movement in a horizontal plane relative to the beam 1, and in order to positively position the bar 3 said bar is adapted to be connected adjacent an end thereof with said beam 1 by means of a rod 7. The rear end of the rod 7 may be secured to the bar 3 and is preferably attached by the same bolt or fastening 8 which is used to secure the adjacent standard 4 to the member 3. The forward end of the rod 7 is provided with an eye 9, through which a loop 10, secured to the beam 1, passes. The upper portion of the loop 10 is formed with hooks, which engage over the upper portion of the beam 1 in order to positively hold the loop in position. A wedge 11 passes through the lower portion of the loop, said wedge being reduced centrally thereof. The wedge 11 when driven in place will effectively hold the loop 10 in position.

The standards 4, carried by the bar 3, are provided with elongated slots 12 at the lower ends, through which a fastening-bolt or similar member 13 may be passed in securing the shovel 14 to its respective standard. The provision of the slot 12 admits of a certain amount of vertical adjustment of the shovels 14, which is advantageous in that said shovels may be lowered as their cutting edges are gradually worn. In order that the mounting of the shovels 14 may be reinforced, each of said shovels is provided at its upper portion with an extension 15, preferably formed by cutting and bending a small portion of the shovel rearwardly, said extension coöperating with a side of the standard to firmly hold the shovel with its point in proper position. The upper extremities of the several standards 4 are formed with parts 17 having openings 16, through which the fastenings 8 upon the bar 3 pass. The shovels 14 may thus be quickly and easily removed, and by substituting small-sized shovels such may be brought into use and the implement converted into a harrow of the type similar to that commonly employed and having reversible harrow-points.

The rod 7 of the cultivator may be disposed upon either side of the beam 1 and connected so that the bar 3 may be adjusted to throw the soil either to the left or to the right. In other words, the rear end of the member 7 may be connnected with either end of the bar 3, as before premised upon. The central standard 4 is preferably provided with a landside 18, and this comprises a flat bar extending rearwardly from the shovel 14 of said standard and an extension 19, projecting upwardly from the landside and attached to the standard 4 by means of the member 13, which secures the shovel 14 thereto. In view of the provision of the slots 12 the landside 18 may be vertically adjusted, as will be readily seen.

Having thus described the invention, what is claimed as new is—

In a cultivator, the combination of the beam 1, the transverse bar 3, the handles 2 secured to the beam 1, the U-shaped brace 6 having the sides thereof attached to the handles 2, the pivot-fastening 5 passing through the brace 6, the beam 1 and the bar 3 securing the same together, the rod 7 connecting the bar 3 and the beam 1, the standards 4 carried by the bar 3, the shovels 14, and the extensions 15 projected from the shovels and formed by cutting or bending a portion of the body of each shovel rearwardly, said extensions 15 coöperating with the standards to hold the shovels in position.

In testimony whereof we affix our signatures in presence of two witnesses.

GEORGE W. SMITH. [L. S.]
JAMES A. SMITH. [L. S.]

Witnesses:
W. W. MITCHELL,
J. S. WHEAT.